US010628081B2

(12) United States Patent
Wells et al.

(10) Patent No.: US 10,628,081 B2
(45) Date of Patent: Apr. 21, 2020

(54) MANAGING INTERNAL COMMAND QUEUES IN SOLID STATE STORAGE DRIVES

(71) Applicant: Toshiba Memory Corporation, Minato-ku, Tokyo (JP)

(72) Inventors: Steven Wells, Rancho Cordova, CA (US); Neil Buxton, Berkshire (GB)

(73) Assignee: Toshiba Memory Corporation, Tokyo (JP)

( * ) Notice: Subject to any disclaimer, the term of this patent is extended or adjusted under 35 U.S.C. 154(b) by 62 days.

(21) Appl. No.: 15/917,119

(22) Filed: Mar. 9, 2018

(65) Prior Publication Data

US 2019/0278515 A1 Sep. 12, 2019

(51) Int. Cl.
*G06F 3/06* (2006.01)
*G06F 13/16* (2006.01)

(52) U.S. Cl.
CPC .......... *G06F 3/0659* (2013.01); *G06F 3/064* (2013.01); *G06F 3/0611* (2013.01); *G06F 3/0679* (2013.01); *G06F 13/161* (2013.01); *G06F 3/0688* (2013.01)

(58) Field of Classification Search
CPC .... G06F 3/0659; G06F 3/0611; G06F 3/0679; G06F 12/0246; G06F 2212/7205
See application file for complete search history.

(56) References Cited

U.S. PATENT DOCUMENTS

| 8,321,627 | B1* | 11/2012 | Norrie | G06F 13/161 |
| | | | | 365/185.33 |
| 10,241,722 | B1* | 3/2019 | Malwankar | G06F 3/0659 |
| 2009/0006719 | A1* | 1/2009 | Traister | G06F 12/0246 |
| | | | | 711/103 |
| 2011/0138100 | A1* | 6/2011 | Sinclair | G06F 13/1647 |
| | | | | 711/5 |
| 2012/0203986 | A1* | 8/2012 | Strasser | G06F 3/0611 |
| | | | | 711/158 |
| 2014/0310494 | A1* | 10/2014 | Higgins | G11C 16/349 |
| | | | | 711/167 |
| 2015/0378622 | A1* | 12/2015 | DeNeui | G06F 3/0619 |
| | | | | 711/114 |
| 2017/0031592 | A1* | 2/2017 | More | G06F 3/061 |
| 2017/0123655 | A1* | 5/2017 | Sinclair | G06F 3/0611 |

(Continued)

*Primary Examiner* — Edward J Dudek, Jr.
(74) *Attorney, Agent, or Firm* — White & Case LLP

(57) ABSTRACT

In one embodiment, a method for reducing the variance in latency of host I/O commands by managing non-host command queues in a solid state storage drive comprises receiving a plurality of non-host commands in at least one non-host command queue, each of the plurality of non-host commands configured to be executed by one of a plurality of non-volatile memory dies, and issuing a non-host command from the at least one non-host command queue to one of the plurality of non-volatile memory dies when a latency-reducing condition is satisfied. In one embodiment, the method further comprises determining that the latency-reducing condition is satisfied if a present number of active non-host commands is less than a first maximum number of active non-host commands. In one embodiment, the method further comprises determining that the latency-reducing condition is satisfied if a latency cost of the non-host command is less than or equal to an available latency budget.

27 Claims, 9 Drawing Sheets

(56) References Cited

U.S. PATENT DOCUMENTS

2018/0182452 A1* 6/2018 Lee .................... G11C 11/5621
2018/0300084 A1* 10/2018 Kachare ................ G06F 3/0653
2019/0042142 A1* 2/2019 Casmira ................ G06F 3/0653
2019/0114276 A1* 4/2019 Hodes ................... G06F 13/385

* cited by examiner

MANAGING INTERNAL COMMAND QUEUES IN SOLID STATE STORAGE DRIVES

FIELD OF THE INVENTION

The invention relates generally to solid state storage drives and more specifically to managing internal command queues in solid state storage drives.

BACKGROUND OF THE INVENTION

Conventionally, solid state storage drive (SSD) architectures and designs have primarily focused on obtaining a high average bandwidth or throughput for input and output (I/O) operations (i.e., reading and writing data). Compared to traditional magnetic storage devices such as hard disk drives (HDDs), SSDs are capable of performing I/O operations that are hundreds, if not thousands, of times greater per second as compared to HDDs. Such conventional SSDs are capable of obtaining such high average bandwidth through parallelism in its architecture.

An SSD typically comprises a number of non-volatile memory dies, such as NAND flash memory, that are arranged in groups coupled to channels controlled by a channel controller. A physical storage block from each of the non-volatile memory dies are commonly selected to create logical blocks, or "superblocks," for one or more host devices, such as a computer or storage appliance, to write and read data to and from, respectively. Selecting a physical block from each of the non-volatile memory dies to form superblocks allows parallel access to all of the non-volatile memory dies across all channels, achieving maximum bandwidth or throughput. A die may further be organized into multiple "planes" (each die comprising two, four, or more planes), where each plane may process an I/O operation in parallel.

While such an SSD architecture maximizes the bandwidth or throughput of an SSD, this architecture also suffers from a number of issues that impact I/O latency (i.e., the amount of time it takes to complete an I/O operation). Due to physical limitations of the non-volatile memory dies, only a single physical block per plane per non-volatile memory die can perform an I/O operation at a time, which leads to collisions between I/O operations to different physical blocks of the same plane of the same non-volatile memory die where an I/O operation must wait until the previous operation to a different block in the same plane has completed as they belong to different logical blocks that the host may be writing to or reading from at the same time. Relatedly, because there are multiple non-volatile memory dies per channel controller, there may also be collisions between commands for I/O operations to different logical blocks at the channel controller, due to the shared nature of a channel in which only one data transfer may proceed at any time between the controller and any non-volatile memory die, leading to bottlenecks at each channel controller of the SSD.

In addition to I/O operations from hosts, the SSD must perform maintenance operations throughout the lifetime of the SSD, such as garbage collection to consolidate valid data and erase invalid data to create free areas for new data to be written. These maintenance operations take place at typically indeterminate times throughout the lifetime of the SSD as needed and last for an indeterminate period of time, which inevitably lead to collisions with host I/O operations at both the channel controllers and the non-volatile memory dies. These collisions, either due to host I/O operations or SSD maintenance operations causes inconsistent and unpredictable SSD latency performance.

Further, in addition to I/O operations from hosts and maintenance operations, the SSD must also perform other internal administrative or "housekeeping" operations throughout its lifetime. Such housekeeping operations typically involve testing for decaying data bits, "warming up" memory cells that have not been accessed recently, and performing other inspections related to the health of the non-volatile memory dies, including rewriting data to new locations to refresh data at risk of being unrecoverable due to age or increased errors. SSDs commonly have the ability to issue such housekeeping-related read, write, and erase commands to all its non-volatile memory dies in parallel and at a high rate. These housekeeping operations involving internal SSD (non-host) read, write, and erase operations can lead to collisions with host I/O operations at the channel controllers and the non-volatile memory dies, which increases the variability of the latency seen by the host.

What is needed, therefore, is an improved technique for managing internal command queues of SSDs to reduce collisions with host I/O operations to provide consistent I/O operation and performance.

BRIEF DESCRIPTION OF THE INVENTION

In one embodiment, a method for reducing the variance in latency of host I/O commands by managing non-host command queues in a solid state storage drive comprises receiving a plurality of non-host commands in at least one non-host command queue, each of the plurality of non-host commands configured to be executed by one of a plurality of non-volatile memory dies, and issuing a non-host command from the at least one non-host command queue to one of the plurality of non-volatile memory dies when a latency-reducing condition is satisfied.

In one embodiment, the method further comprises setting a first maximum number of active non-host commands, where an active non-host command is a non-host command that has been issued to one of the plurality of non-volatile memory dies for execution and has not completed, comparing a present number of active non-host commands to the first maximum number of active non-host commands, and determining that the latency-reducing condition is satisfied if the present number of active non-host commands is less than the first maximum number of active non-host commands. In one embodiment, the method further comprises incrementing a value representing the present number of active non-host commands upon issuance of the non-host command for execution; and decrementing the value representing the present number of active non-host commands upon completion of an issued non-host command. In one embodiment, the method further comprises setting the first maximum number of active non-host commands to a first predetermined value when the plurality of non-volatile memory dies is in a first operation mode, and setting the first maximum number of active non-host commands to a second predetermined value when the plurality of non-volatile memory dies is in a second operation mode, the second operation mode being different from the first operation mode. In one embodiment, the method further comprises setting the first maximum number of active non-host commands for a first region of the plurality of non-volatile memory dies, the first region comprising a first subset of physical blocks of the plurality of non-volatile memory dies, and setting a second maximum number of active non-host commands for a second region of the plurality of non-volatile memory dies, the second region comprising a second subset of physical blocks of the plurality of non-volatile memory dies, the second region being different than the first region.

In one embodiment, the method further comprises pulling a non-host command from the at least one non-host command queue, assigning a latency cost to the non-host command, comparing the latency cost of the non-host command to an available latency budget for active non-host commands, where an active non-host command is a non-host command that has been issued to one of the plurality of non-volatile memory dies for execution and has not completed, and determining that the latency-reducing condition is satisfied if the latency cost of the non-host command is less than or equal to the available latency budget. In one embodiment, the method further comprises subtracting the latency cost of the non-host command from the available latency budget upon issuance of the non-host command to one of the plurality of non-volatile memory dies; and adding the latency cost of the non-host command to the available latency budget upon completion of the non-host command. In one embodiment, the method further comprises setting the available latency budget equal to a total latency budget for active non-host commands prior to issuing non-host commands to the plurality of non-volatile memory dies. In one embodiment, assigning a latency cost to the non-host command comprises determining a latency effect the non-host command will cause to a succeeding command addressed to the same one of the plurality of non-volatile memory dies as the non-host command. In one embodiment, assigning a latency cost to the non-host command comprises determining a latency effect the non-host command will cause to a succeeding command addressed to one of the plurality of non-volatile memory dies communicatively coupled to a channel to which the one of the plurality of non-volatile memory dies addressed in the non-host command is coupled. In one embodiment the method further comprises determining a present operation mode of the plurality of non-volatile memory dies, the present operation mode being one of a first operation mode or a second operation mode, setting the available latency budget equal to a first total latency budget when the plurality of non-volatile memory dies is in the first operation mode, and setting the available latency budget equal to a second total latency budget when the plurality of non-volatile memory devices is in the second operation mode. In one embodiment, the method further comprises maintaining a first available latency budget for a first region of the plurality of non-volatile memory dies, the first region comprising a first subset of physical blocks of the plurality of non-volatile memory dies, and maintaining a second available latency budget for a second region of the plurality of non-volatile memory dies, the second region comprising a second subset of physical blocks of the plurality of non-volatile memory dies, the second region being different than the first region.

In one embodiment, a system for reducing the variance in latency of host I/O commands by managing non-host command queues in a solid state storage drive comprises a plurality of non-volatile memory dies, at least one non-host command queue configured to store a plurality of non-host commands, each of the plurality of non-host commands configured to be executed by one of the plurality of non-volatile memory dies, and a memory controller communicatively coupled to each of the plurality of non-volatile memory dies, the memory controller configured to issue a non-host command from the at least one non-host command queue to one of the plurality of non-volatile memory dies when a latency-reducing condition is satisfied.

In one embodiment, the memory controller is configured to set a first maximum number of active non-host commands, where an active non-host command is a non-host command that has been issued to one of the plurality of non-volatile memory dies for execution and has not completed, compare a present number of active non-host commands to the first maximum number of active non-host commands, and determine that the latency-reducing condition is satisfied if the present number of active non-host commands is less than the first maximum number of active non-host commands. In one embodiment, the memory controller is further configured to increment a value representing the present number of active non-host commands upon issuance of the non-host command for execution, and decrement the value representing the present number of active non-host commands upon completion of an issued non-host command. In one embodiment, the memory controller is configured to set the first maximum number of active non-host commands to a first predetermined value when the plurality of non-volatile memory dies is in a first operation mode, and to set the first maximum number of active non-host commands to a second predetermined value when the plurality of non-volatile memory dies is in a second operation mode, the second operation mode being different than the first operation mode. In one embodiment, each of the plurality of non-volatile memory dies comprises a plurality of physical blocks, a first region comprises a first subset of physical blocks of the plurality of non-volatile memory dies, and a second region comprises a second subset of physical blocks of the plurality of non-volatile memory dies, the second region being different from the first region, and the memory controller is further configured to set the first maximum number of active non-host commands for the first region and to set a second maximum number of active non-host commands for the second region.

In one embodiment, the memory controller is configured to pull a non-host command from the at least one non-host command queue, assign a latency cost to the non-host command, compare the latency cost of the non-host command to an available latency budget for active non-host commands, where an active non-host command is a non-host command that has been issued to one of the plurality of non-volatile memory dies for execution and has not completed, and determine that the latency-reducing condition is satisfied if the latency cost of the non-host command is less than or equal to the available latency budget. In one embodiment, the memory controller is further configured to subtract the latency cost of the non-host command from the available latency budget upon issuance of the non-host command to one of the plurality of non-volatile memory dies, and add the latency cost of the non-host command to the available latency budget upon completion of the non-host command. In one embodiment, the memory controller is further configured to set the available latency budget equal to a total latency budget for active non-host commands prior to issuing non-host commands to the plurality of non-volatile memory dies. In one embodiment, the memory controller is configured to assign the latency cost to the non-host command by determining a latency effect the non-host command will cause to a succeeding command addressed to the same one of the plurality of non-volatile memory dies as the non-host command. In one embodiment, the memory controller is configured to assign the latency cost to the non-host command by determining a latency effect the non-host command will cause to a succeeding command addressed to one of the plurality of non-volatile memory dies communicatively coupled to a channel to which the one of the plurality of non-volatile memory dies addressed in the non-host command is coupled. In one embodiment, the memory controller is further configured to determine a present operation mode of the plurality of non-volatile memory dies, the present operation mode being one of a first operation mode or a second operation mode, set the available latency budget equal to a first total latency budget when the plurality of non-volatile memory dies is in the first operation mode, and set the available latency budget equal to a second total latency budget when the plurality of non-volatile memory devices is in the second operation mode. In one embodiment, each of the plurality of non-volatile memory dies comprises a plurality of physical blocks, a first region comprises a first subset of physical blocks of the plurality of non-volatile memory dies, and a second region comprises a second subset of physical blocks of the plurality of non-volatile memory dies, the second region being different from the first region, and the memory controller is further configured to maintain a first available latency budget for the first region and a second available latency budget for the second region.

DETAILED DESCRIPTION OF THE INVENTION

Figure 1:
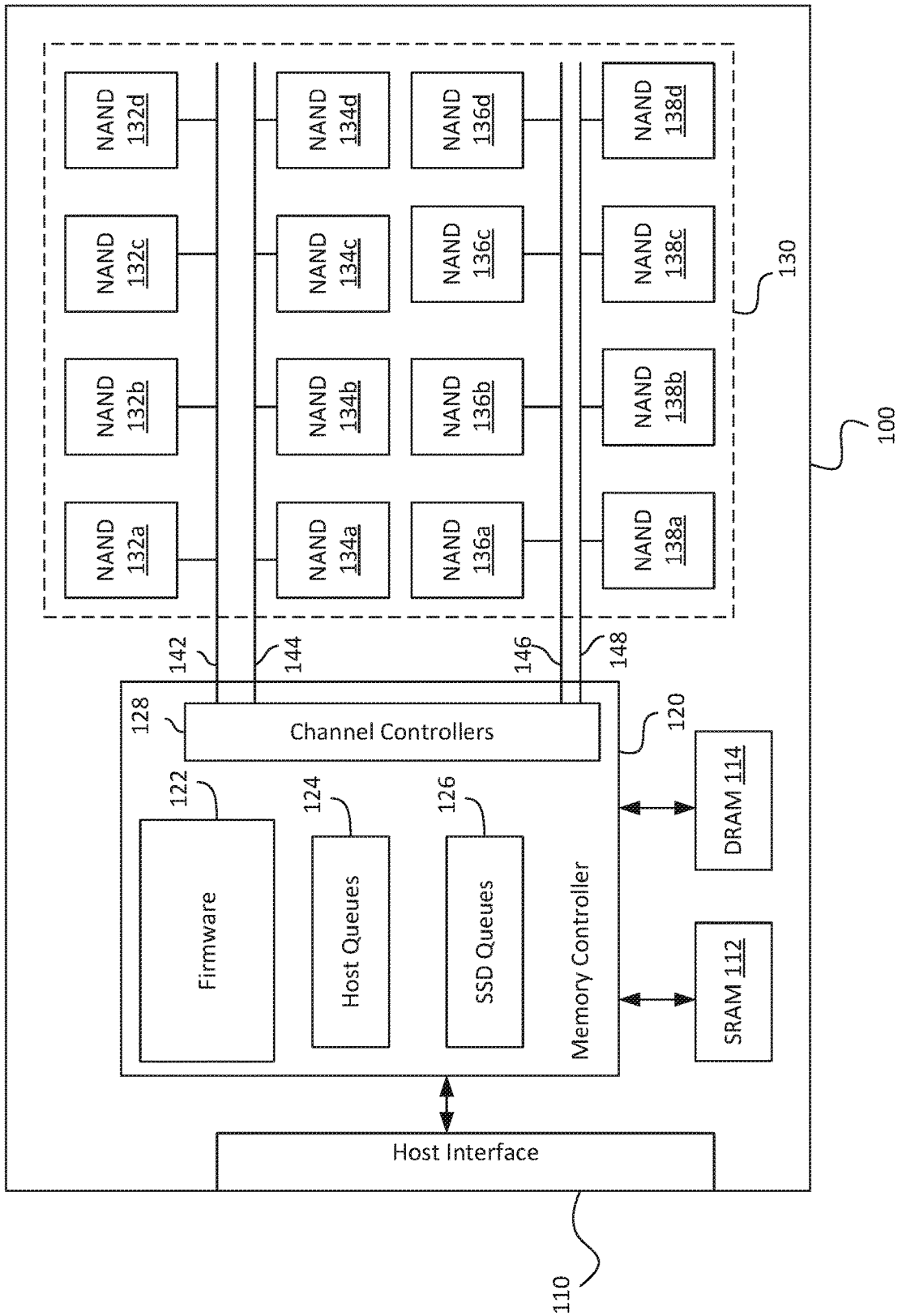
FIG. 1 is a diagram of a solid state storage drive, according to one embodiment.

FIG. 1 is a diagram of a solid state storage drive (SSD) 100, according to one embodiment. SSD 100 includes a host interface 110 that allows SSD 100 to be communicatively coupled to a bus for communication with one or more host devices or host applications. Non-Volatile Memory Express (NVMe) over Fabrics, NVMe over Peripheral Component Interconnect Express (PCIe or PCI Express), Serial ATA (SATA), and Serial Attached SCSI (SAS) are suitable bus interface protocols for communications between SSD 100 and one or more hosts. SSD 100 includes a memory controller 120 in communication with an SRAM 112, a DRAM 114, and an array 130 of NAND flash memory dies 132a-d, 134a-d, 136a-d, and 138a-d. Memory controller 120 manages the writing (programming), reading, and erasing of data stored in NAND array 130. Memory controller 120 includes, but is not limited to, firmware 122, host queues 124, SSD queues 126, and channel controllers 128. Firmware 122 includes, but is not limited to, a flash translation layer (not shown) to map logical block addresses of data from a host to physical pages and blocks of NAND dies 132a-d, 134a-d, 136a-d, and 138a-d. Memory controller 120 may use SRAM 112 and DRAM 114 as buffers for temporarily storing data (caching) and for performing error correction coding and the like.

NAND dies 132a-d, 134a-d, 136a-d, and 138a-d are arranged in four channels 142, 144, 146, and 148 in communication with channel controllers 128 of memory controller 120. While sixteen NAND dies 132a-d, 134a-d, 136a-d, and 138a-d arranged in four channels are shown in SSD 100 in FIG. 1, the specific number of NAND dies and channels is not limited as such, and SSD 100 may include one or more NAND flash memory dies arranged in one or more channels within the scope of the invention. In one embodiment, NAND dies 132a-d, 134a-d, 136a-d, and 138a-d are SLC NAND dies, MLC NAND dies, TLC NAND dies, QLC NAND dies, or a combination thereof. In one embodiment, channel controllers 128 include a channel controller for each of channels 142, 144, 146, and 148. In another embodiment, channel controllers 128 includes two dual-channel controllers, where each dual-channel controller is in communication with two of channels 142, 144, 146, and 148.

Host queues 124 include but are not limited to one or more host command queues that receive and store commands from one or more hosts to perform input/output (I/O) operations such as read operations and write (program) operations in NAND array 130. SSD queues 126 include but are not limited to one or more SSD command queues that receive and store commands from firmware 122 for internal SSD operations (i.e., non-host originated commands) including maintenance operations such as garbage collection, and housekeeping operations to test for decaying data bits, to "warm up" memory cells that have not been accessed recently, to test memory cells by writing known data and reading back the data from the cells using different memory read threshold voltages, and to perform other inspections related to the health of NAND dies 132a-d, 134a-d, 136a-d, and 138a-d. In one embodiment, SSD queues 126 include one or more SSD command queues that receive and store internal SSD commands from firmware 122 to NAND array 130. As used herein, the term "SSD command" means an internal command issued to a NAND die by firmware 122 as opposed to a host command that originated as a result of a host I/O command from a host via host interface 110. SSD commands include read, write (program), erase, status or any other type of command supported by NAND array 130. Write (program) commands and erase commands in particular have a more significant effect on latencies because these types of commands have much longer operation cycle times than read commands (on the order of tens of microseconds for read commands, hundreds of microseconds for program commands, and thousands of microseconds for erase commands). In one embodiment, SSD queues 126 also include one or more SSD command completion queues to store completions of SSD commands.

In one embodiment, the physical blocks of NAND array 130 are organized into logical isolation regions, or superblocks. In one embodiment, a physical block from each of NAND dies 132a-d, 134a-d, 136a-d, and 138a-d is selected to create a logical isolation region for one or more host devices to write and read data to and from, respectively. Selecting a physical block from each of NAND dies 132a-d, 134a-d, 136a-d, and 138a-d to form isolation regions allows parallel access to all of NAND dies 132a-d, 134a-d, 136a-d, and 138a-d across all channels 142, 144, 146, 148.

In another embodiment, a number of isolation regions are formed in NAND array 130 by selecting all of the physical blocks on all NAND dies on two adjacent channels. For example, a first isolation region in NAND array 130 may include all of the physical blocks of NAND dies 132a-d on channel 142 and all of the physical blocks of NAND dies 134a-d on channel 144, and a second isolation region may include all of the physical blocks of NAND dies 136a-d on channel 146 and all of the physical blocks of NAND dies 138a-d on channel 148. Such an embodiment and further embodiments of isolation regions within an SSD architecture are disclosed in U.S. patent application Ser. No. 15/800,742, entitled "SSD Architecture Supporting Low Latency Operation," the subject matter of which is hereby incorporated by reference in its entirety.

Memory controller 120 presents each isolation region in NAND array 130 as a separate logical "sub-drive" to one or more hosts. For example, in an embodiment in which NAND array 130 is organized as two isolation regions, host queues 124 include a two separate host queues, one for each of the isolation regions. Similarly, in this embodiment SSD queues 126 include a separate SSD command queue for each of the isolation regions.

In one embodiment, SSD 100 implements I/O determinism, in which SSD 100 operates in one of two distinct modes at any given time—a deterministic mode and a non-deterministic mode. In the deterministic mode, it is preferred that only read operations are performed by NAND array 130 or one or more isolation regions within NAND array 130, in order to minimize the variance in latency. The deterministic mode provides lower and more predictable latency because it is limited to performing read operations, which are completed relatively quickly (e.g., between 60 µs to 100 µs typically for TLC NAND flash memory). In one embodiment, when a host selects deterministic mode, the host may be self-policing and follow a rule that only read commands are issued by the host to SSD 100, ensuring that only read commands are added to the tails of host queues 124. In one embodiment, memory controller 120 may be self-policing and follow a rule that while in deterministic mode, the only SSD commands issued to NAND array 130 are read commands, by adding only read commands to the tails of SSD queues 126. In the non-deterministic mode, all types of operations are performed by NAND array 130 or one or more isolation regions within NAND array 130. SSD architectures implementing I/O determinism are further described in U.S. patent application Ser. No. 15/800,742, referenced above.

In an embodiment in which SSD 100 implements I/O determinism and NAND array 130 is not organized into isolation regions, SSD 100 will toggle between periods of time in deterministic mode and periods of time in non-deterministic mode. In this embodiment, while in deterministic mode memory controller 120 will only issue read commands to NAND array 130, including both host read commands and non-host read commands (SSD read commands) such as read commands associated with housekeeping operations. In an embodiment in which SSD 100 implements I/O determinism and NAND array 130 is organized into isolation regions, SSD 100 schedules periods of deterministic mode and periods of non-deterministic mode separately for each isolation region. In this embodiment, one or more isolation regions may be in deterministic mode while the remaining isolation regions are in non-deterministic mode.

Figure 2:
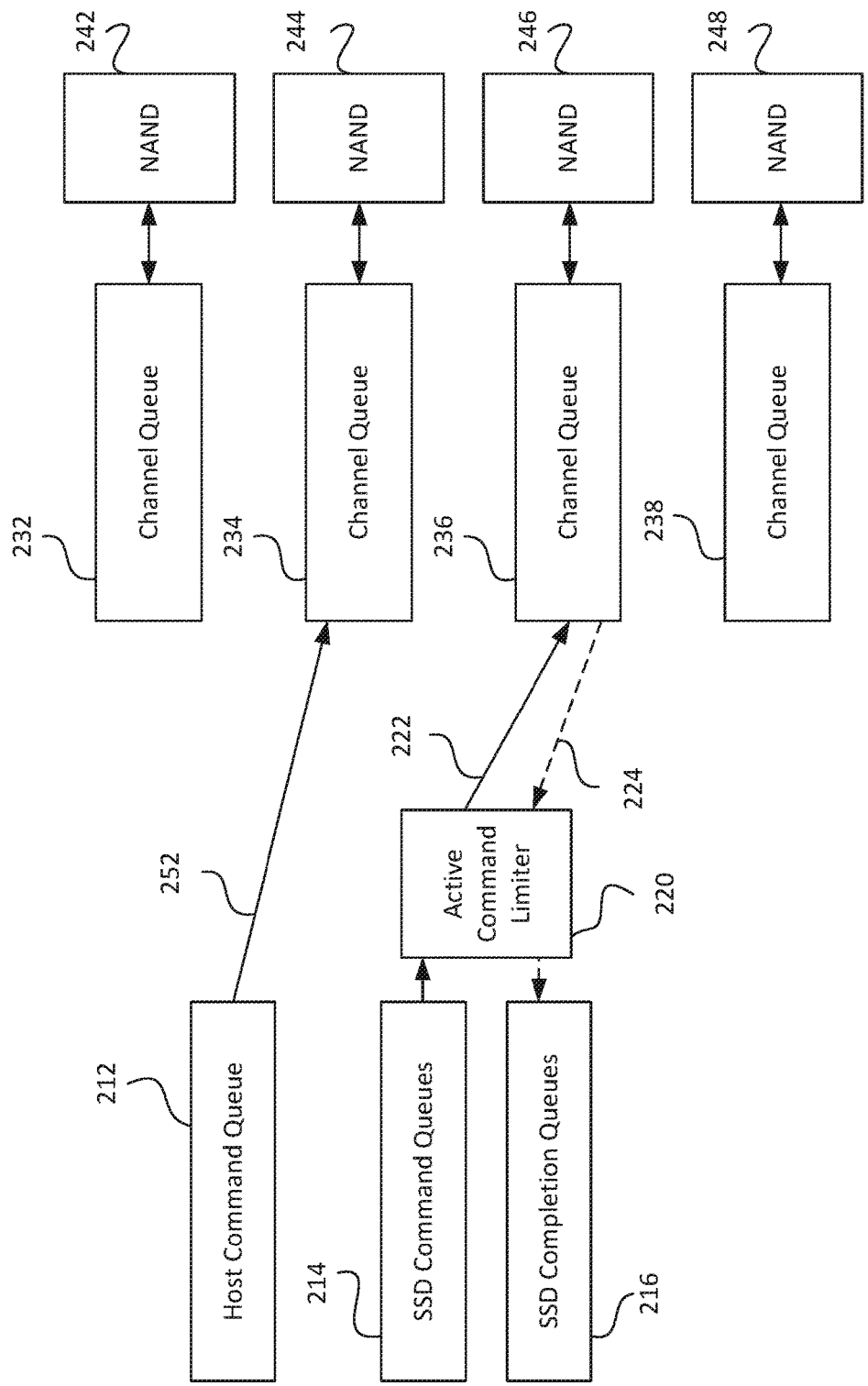
FIG. 2 is a diagram of a logical flow of commands between command queues and non-volatile memory dies, according to one embodiment.

FIG. 2 is a diagram of a flow of commands between queues and NAND flash memory devices, according to one embodiment. Four channel queues 232, 234, 236, and 238 and four NAND dies 242, 244, 246, and 248 are shown in FIG. 2 for ease of illustration; the specific number of channel queues and NAND dies is not so limited. In one embodiment, each of channel queues 232, 234, 236, and 238 stores commands for all NAND dies coupled to a single channel (i.e., one queue per channel). A host command queue 212 receives I/O commands that originated from one or more host devices. Each host I/O command is addressed to one or more logical block addresses and is converted into one or more flash memory commands addressed to pages or blocks within one or more NAND dies by the flash translation layer of memory controller 120. For example, a host command 252 addressed to a page or block within NAND die 244 is pulled from the head of host command queue 212 and issued to channel queue 234, which stores one or more commands to be executed by NAND die 244 and other NAND dies on that channel (not shown). One or more SSD command queues 214 receive and store commands related to administrative or housekeeping tasks issued by firmware 122 (i.e., non-host commands). In one embodiment SSD command queues 214 include a normal priority queue and a high priority queue. In one embodiment, SSD command queues 214 include one or more separate SSD command queues for each command type, for example an SSD read command queue, an SSD program command queue, and an SSD erase command queue. In one embodiment, SSD command queues 214 is a single queue that may contain all types of commands (read, program, and erase). In one embodiment, SSD command queues 214 are circular buffers having a plurality of slots or entries.

Active command limiter 220 enforces a limit on the SSD commands that are concurrently active in NAND array 130 by issuing SSD commands for execution when a latency-reducing condition has been satisfied. An active command is a command that has been issued to NAND array 130 and has not yet completed. In one embodiment, the limit is the number of SSD read commands that are active in NAND array 130. By limiting the number of SSD commands that are concurrently active, the probability of a collision between an SSD command and a host command is reduced and thus latency variations in the performance of the SSD are minimized. In one embodiment, active command limiter 220 maintains a count of the number of SSD commands that are active, i.e., the SSD commands that have been issued to channel queues 232, 234, 236, 238 for execution but have not yet completed. Active command limiter 220 compares the present count of the number of active SSD commands with a maximum number of allowed active commands and only issues a queued SSD command 222 for execution if the present count is less than the maximum allowed.

In one embodiment, the maximum number of allowed active commands is a predetermined value that remains constant. In other embodiments, the maximum number of allowed active commands is a parameter whose value can be changed by firmware 122 or a host. In one embodiment, the maximum number of allowed active commands is set to a first value when NAND dies 242, 244, 246, and 248 are in deterministic mode and is set to a second value when NAND dies 242, 244, 246, and 248 are in non-deterministic mode. In one embodiment, the maximum number of allowed active commands in non-deterministic mode is set to a value that depends on the number of commands pending in SSD command queues 214. In this embodiment, any backlog of SSD commands put into SSD command queues 214 while in deterministic mode may be processed more quickly in non-deterministic mode to ensure that the overall rate of processing SSD commands in deterministic mode and non-deterministic mode meets a minimum required level.

When active command limiter 220 issues a queued SSD command 222 to one of channel queues 232, 234, 236, 238 active command limiter 220 also increments the count of the present number of active commands. When active command limiter 220 receives a completion 224 of an active SSD command, active command limiter 220 decrements the count of the present number of active commands. By incrementing a count of active SSD commands when an SSD command is issued to NAND dies 242, 244, 246, and 248 via channel queues 232, 234, 236, and 238 and decrementing the count of active SSD commands when an SSD command completion is returned, active command limiter 220 maintains a present count of active SSD commands. Active command limiter 220 also ensures that the present number of active SSD commands does not exceed the maximum number of allowed active SSD commands.

In another embodiment, active command limiter 220 limits the number of concurrently active SSD commands by enforcing a latency budget for concurrently active SSD commands. In this embodiment, active command limiter 220 establishes a total latency budget for active SSD commands, assigns a latency cost to each SSD command, and maintains a presently available latency budget as each SSD command is issued and completed. In one embodiment, each of the total latency budget, the available latency budget, and the latency cost of a non-host command is expressed as a number of units of time, for example a number of nanoseconds or microseconds. Active command limiter 220 compares the latency cost of an SSD command to the available latency budget, and only issues the SSD command to channel queues 232, 234, 236, 238 if the cost is less than or equal to the available latency budget. In one embodiment, active command limiter 220 assigns the cost to an SSD command based on the latency that the SSD command will cause to a succeeding SSD command waiting to be issued to the same NAND die or waiting to be issued to a different NAND die on the same channel. In one embodiment, the latency that the SSD command will cause to a succeeding SSD command depends on the command type. For example, an erase command will cause a longer latency to a succeeding command than a read command. When active command limiter 220 issues a queued SSD command 222 to one of channel queues 232, 234, 236, 238 active command limiter 220 also subtracts the latency cost of the issued SSD command from the available latency budget. When active command limiter 220 receives a completion 224 of an active SSD commands, active command limiter 220 adds the latency cost of the completed SSD command to the available latency budget. By maintaining a presently available latency budget that accounts for the latency cost of each issued SSD command and not issuing a further SSD command if there is insufficient latency budget available, active command limiter 220 ensures that the latency caused by active SSD commands is limited to the total latency budget.

In one embodiment, active command limiter 220 is a program (set of executable instructions) implemented as part of firmware 122 of memory controller 120. In another embodiment, active command limiter 220 is a dedicated hardware-accelerated component of memory controller 120. One or more SSD completion queues 216 receive and store command completions from active command limiter 220 and firmware 122 pulls command completions from SSD completion queues 216. In another embodiment, active command limiter 220 sends completions of SSD commands directly to firmware 122.

Figure 3A:
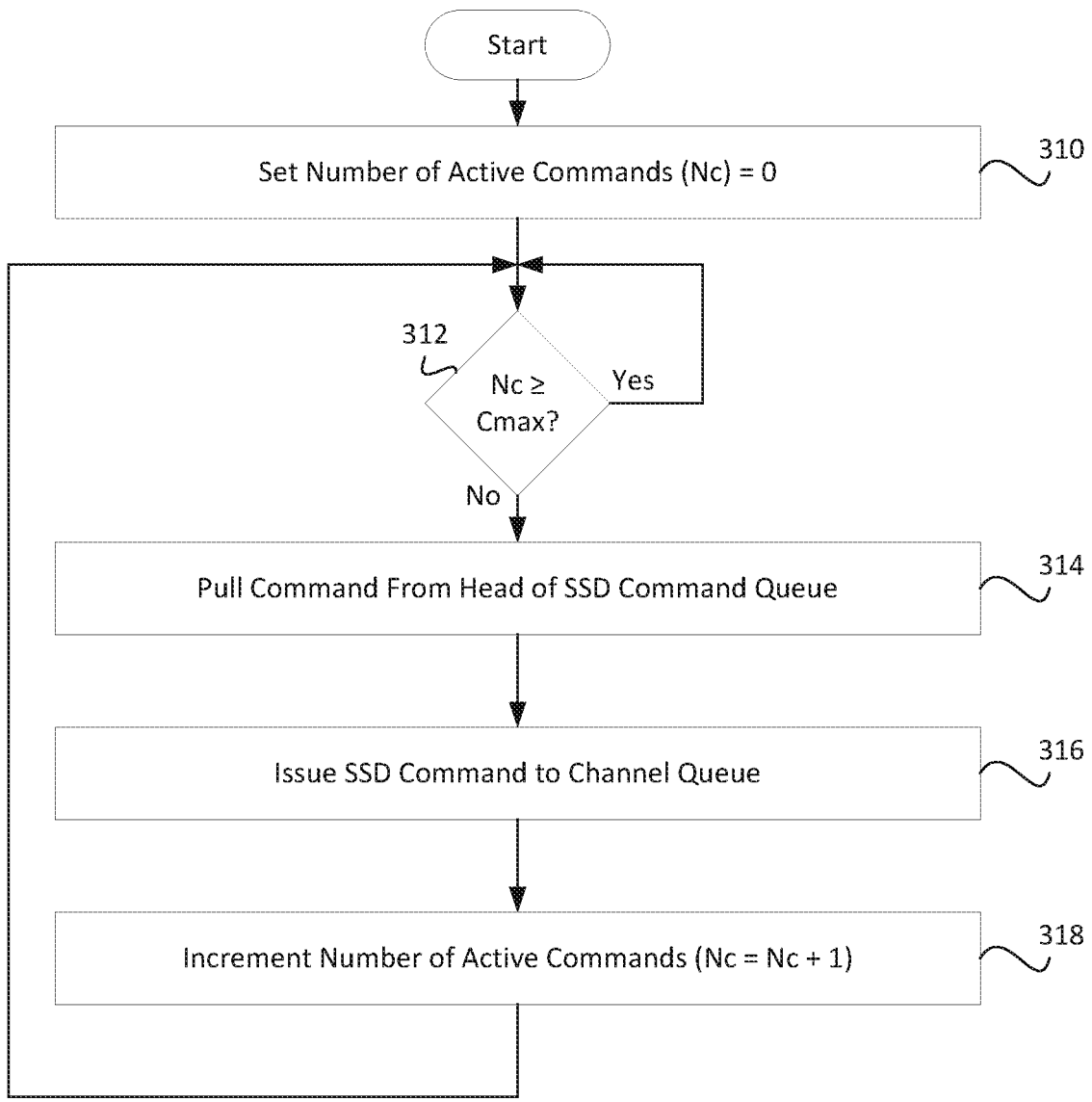
FIG. 3A is a flowchart of method steps for managing internal command queues in a solid state storage drive, according to one embodiment.

FIG. 3A is a flowchart of method steps for managing internal command queues in a solid state storage drive, according to one embodiment. In a step 310, active command limiter 220 sets present count of the number of active SSD commands (Nc) equal to zero. In a step 312, active command limiter 220 compares the number of active SSD commands to a maximum number of allowed active SSD commands (Cmax). If the number of active SSD commands is greater than or equal to the maximum allowed number, then the method repeats step 312. If the number of active SSD commands is not greater than or equal to the maximum allowed number, the method continues in a step 314. In step 314, active command limiter 220 pulls the command presently at the head of one of SSD command queues 214. In a step 316, active command limiter 220 issues the SSD command to the channel queue for the NAND die addressed in the SSD command. In step 318, active command limiter 220 increments the number of active commands by one. The method then returns to step 312.

Figure 3B:
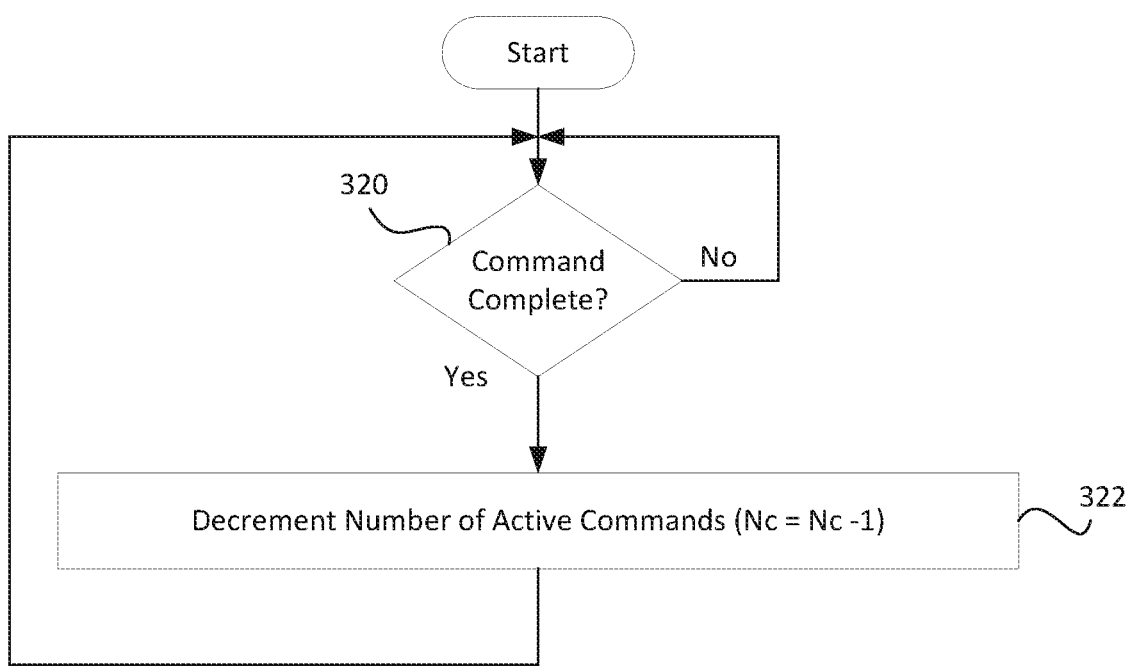
FIG. 3B is a flowchart of method steps for managing internal command queues in a solid state storage drive, according to one embodiment.

FIG. 3B is a flowchart of method steps for managing internal command queues in a solid state storage drive, according to one embodiment. The method steps of FIG. 3B are a companion to the method steps of FIG. 3A, as both modify the count of the present number of active SSD commands. In a step 320, active command limiter 220 determines whether an active command has completed. If not, active command limiter 220 repeats step 410 to check for completion of an active command. If an active command has completed (i.e., active command limiter 220 has received a completion associated with an SSD command), then in a step 322 active command limiter 220 decrements the number of active commands by one. The method then returns to step 320.

In one embodiment, active command limiter 220 performs the methods of FIGS. 3A and 3B concurrently to maintain a present count of the number of SSD commands active in NAND array 130 and to ensure that the number of active SSD commands does not exceed the predetermined maximum number of allowed active SSD commands.

Figure 4A:
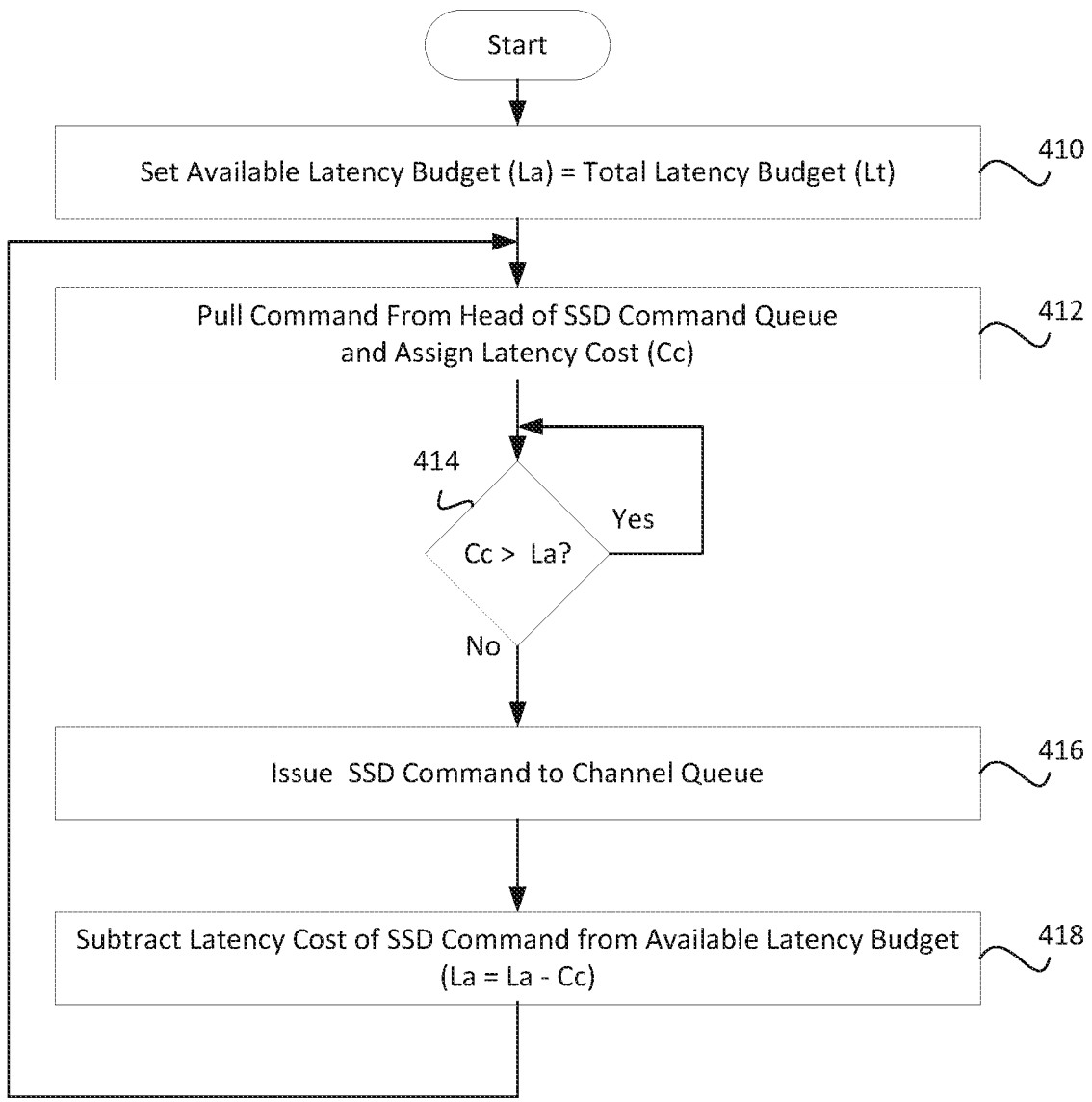
FIG. 4A is a flowchart of method steps for managing internal command queues in a solid state storage drive, according to one embodiment.

FIG. 4A is a flowchart of method steps for managing internal command queues in a solid state storage drive, according to one embodiment. In a step 410, active command limiter 220 sets the available latency budget for active SSD commands (La) equal to a predetermined total latency budget (Lt). In a step 412, active command limiter 220 pulls the SSD command presently at the head of one of SSD command queues 214 and assigns a latency cost (Cc) to that SSD command. In one embodiment, each of the total latency budget, the available latency budget, and the latency cost of a non-host command is expressed as a number of units of time, for example a number of nanoseconds or microseconds. In a step 414, active command limiter 220 compares the latency cost of the SSD command (Cc) to the available latency budget (La). If the latency cost of the SSD command is greater than the available latency budget, then the method repeats step 414. If the latency cost of the SSD command is less than or equal to the available latency budget, the method continues to a step 416. In step 416, active command limiter 220 issues the SSD command to the channel queue for the NAND die addressed in the SSD command. In a step 418, active command limiter 220 subtracts the latency cost of the SSD command from the available latency budget. The method then returns to step 412.

Figure 4B:
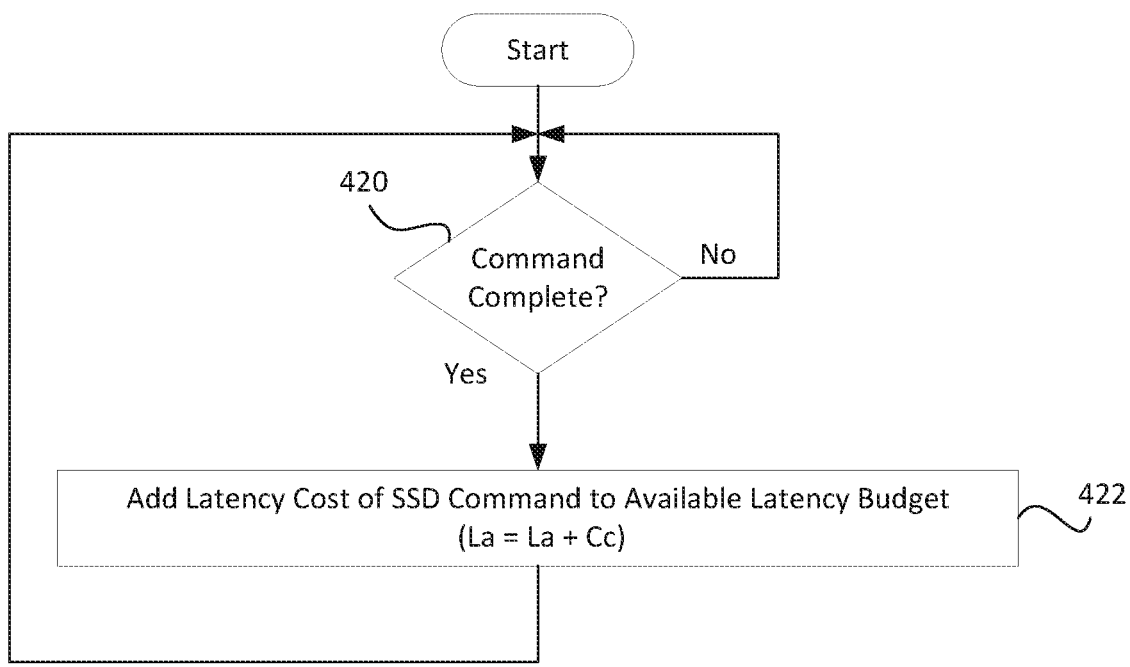
FIG. 4B is a flowchart of method steps for managing internal command queues in a solid state storage drive, according to one embodiment.

FIG. 4B is a flowchart of method steps for managing internal command queues in a solid state storage drive, according to one embodiment. The method steps of FIG. 4B are a companion to the method steps of FIG. 4A, as both modify the available latency budget for active SSD commands. In a step 420, active command limiter 220 determines whether an active SSD command has completed. If not, active command limiter 220 repeats step 420 to check for completion of an active SSD command. If an active SSD command has completed (i.e., active command limiter 220 has received a completion associated with an SSD command), then in step 422 active command limiter 220 adds the latency cost of the completed SSD command (Cc) to the available latency budget (La). The method then returns to step 420.

In one embodiment, active command limited performs the methods of FIGS. 4A and 4B concurrently to maintain a presently available latency budget for SSD commands issued to NAND array 130 and to ensure that the latency cost of any SSD command to be issued does not exceed the present available latency budget.

Figure 5:
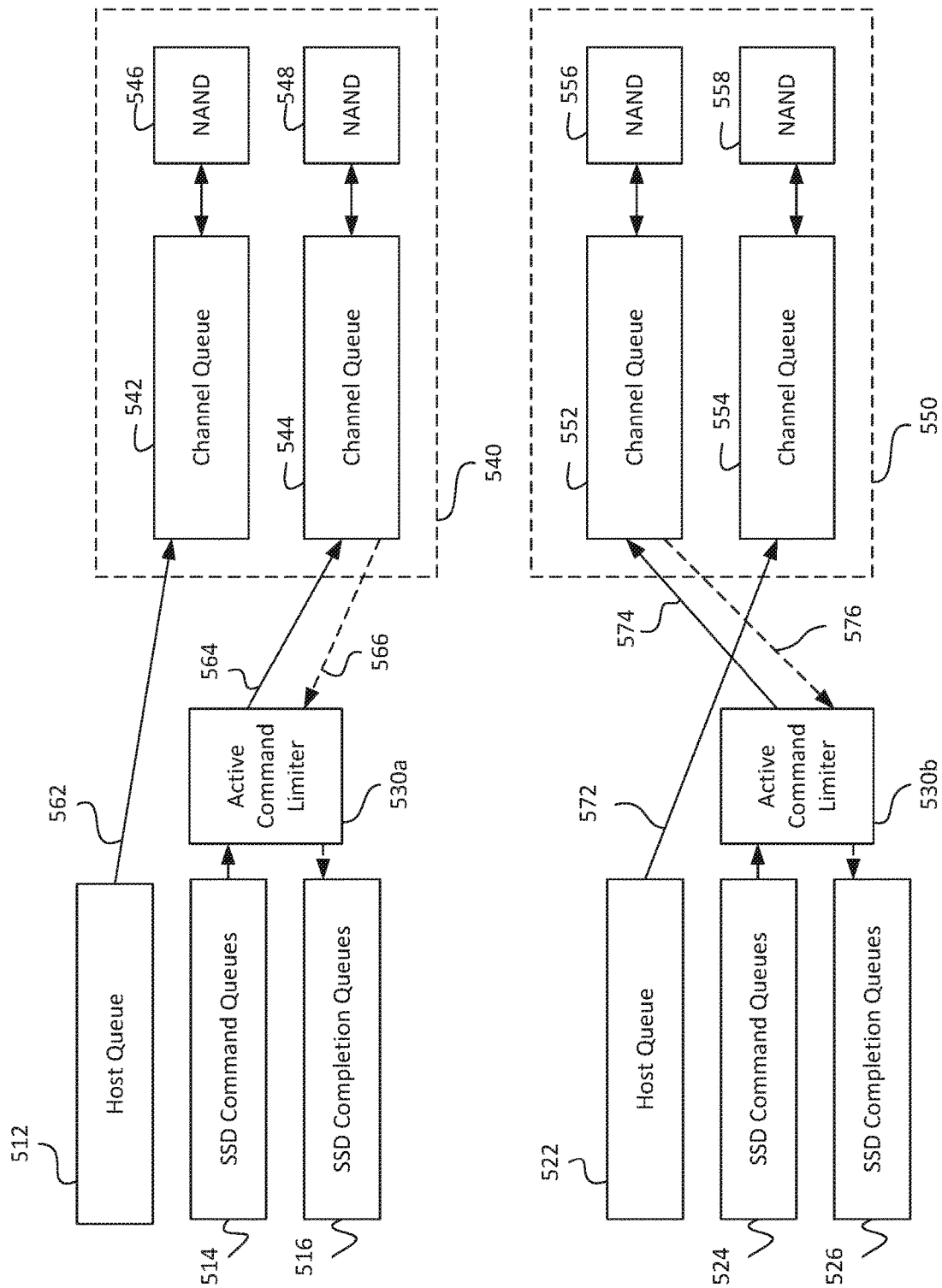
FIG. 5 is a diagram of a logical flow of commands between command queues and isolation regions within an array of non-volatile memory dies, according to one embodiment.

FIG. 5 is a diagram of a logical flow of commands between command queues and isolation regions within an array of non-volatile memory dies, according to one embodiment. In the FIG. 5 embodiment, a NAND array is organized into two isolation regions 540 and 550. Isolation region 540 includes but is not limited to a NAND die 546 in communication with a channel queue 542 and a NAND die 548 in communication with a channel queue 544. Isolation region 550 includes but is not limited to a NAND die 556 in communication with a channel queue 552 and a NAND die 558 in communication with a channel queue 554. Two isolation regions 540 and 550, each including two NAND dies in communication with a channel queue, are shown in FIG. 5 for ease of illustration; the specific numbers of isolation regions, channel queues, and NAND dies are not so limited.

In one embodiment, each of channel queues 542, 544, 552, and 554 stores commands for all NAND dies coupled to a single channel (i.e., one queue per channel). A host command queue 512 receives I/O commands that originated from one or more host devices for isolation region 540. Each host I/O command is addressed to one or more logical block addresses and is converted into one or more flash memory commands addressed to pages or blocks within one or more NAND dies by the flash translation layer of memory controller 120. For example, a host command 562 addressed to a page or block within NAND die 546 is pulled from the head of host command queue 512 and issued to channel queue 542, which stores one or more host commands to be executed by NAND die 546 and other NAND dies on that channel (not shown).

One or more SSD command queues 514 receive and store commands related to administrative or housekeeping tasks issued by firmware 122 (i.e., non-host commands) for isolation region 540. One or more SSD completion queues 516 receive and store command completions from an active command limiter 530a and firmware 122 pulls command completions from SSD completion queues 516. In another embodiment, active command limiter 530a sends completions of SSD commands directly to firmware 122.

A host command queue 522 receives I/O commands that originated from one or more host devices for isolation region 550. Each host I/O command is addressed to one or more logical block addresses and is converted into one or more flash memory commands addressed to pages or blocks within one or more NAND dies by the flash translation layer of memory controller 120. For example, a host command 572 addressed to a page or block within NAND die 558 is pulled from the head of host command queue 522 and issued to channel queue 554, which stores one or more host commands to be executed by NAND die 558 and other NAND dies on that channel (not shown). One or more SSD command queues 524 receive and store commands related to administrative or housekeeping tasks issued by firmware 122 (i.e., non-host commands) for isolation region 550. One or more SSD completion queues 526 receive and store command completions from an active command limiter 530b and firmware 122 pulls command completions from SSD completion queues 526. In another embodiment, active command limiter 530b sends completions of SSD commands directly to firmware 122.

Active command limiter 530a enforces a limit on SSD commands that are active in isolation region 540. In one embodiment, the limit is the number of SSD read commands that are active in isolation region 540. By limiting the number of SSD commands that are concurrently active in isolation region 540, the probability of a collision between an SSD command and a host command is reduced and latency variations in the performance of isolation region 540 are minimized. In one embodiment, active command limiter 530a maintains a count of the number of SSD commands that are active, i.e., the SSD commands that have been issued to channel queues 542 and 544 for execution but have not yet completed. Active command limiter 530a compares the present count of the number of active SSD commands in isolation region 540 with a maximum number of allowed active commands and only issues a queued SSD command 564 for execution if the present count is less than the maximum allowed. In one embodiment, the maximum number of allowed active commands is a predetermined value that remains constant. In other embodiments, the maximum number of allowed active commands is a parameter whose value can be changed by firmware 122 or a host. In one embodiment, the maximum number of allowed active commands has a first value when isolation region 540 is in deterministic mode and has a second value when isolation region 540 is in non-deterministic mode. In one embodiment, the maximum number of allowed active commands in non-deterministic mode is set to a value that depends on the number of commands pending is SSD command queues 514. In this embodiment, any backlog of SSD commands put into SSD command queues 514 while isolation region 540 is in deterministic mode may be processed more quickly in non-deterministic mode to ensure that the overall rate of processing SSD commands in deterministic and non-deterministic mode meets a minimum required level.

When active command limiter 530a issues a queued SSD command 564 to one of channel queues 542, 544 active command limiter 530a also increments the count of the number of active commands. When active command limiter 530a receives a completion 566 of an active SSD command, active command limiter 530a decrements the count of the number of active commands. By incrementing a count of active SSD commands when an SSD command is issued to isolation region 540 and decrementing the count of active SSD commands when an SSD command completion is returned, active command limiter 530a maintains a present count of active SSD commands for isolation region 540. Active command limiter 530a also ensures that the present number of active SSD commands does not exceed the maximum number of allowed active SSD commands for isolation region 540.

In another embodiment, active command limiter 530a limits the number of concurrently active SSD commands in isolation region 540 by enforcing a latency budget for active SSD commands. In this embodiment, active command limiter 530a establishes a total latency budget for active SSD commands in isolation region 540, assigns a latency cost to each SSD command, and maintains a presently available latency budget as each SSD command is issued and completed. Active command limiter 530a compares the latency cost of an SSD command to the available latency budget, and only issues the SSD command to isolation region 540 if the cost is less than or equal to the available latency budget. In one embodiment, active command limiter 530a assigns the cost to an SSD command based on the latency that the SSD command will cause to a succeeding SSD command waiting to be issued to the same NAND die or waiting to be issued to a different NAND die on the same channel in isolation region 540. In one embodiment, the latency that the SSD command will cause to a succeeding SSD command depends on the command type. For example, an erase command will cause a longer latency to a succeeding command than a read command. When active command limiter 530a issues a queued SSD command 564 to one of channel queues 542,544 active command limiter 530a also subtracts the latency cost of the issued SSD command from the available latency budget. When active command limiter 530a receives a completion 566 of an active SSD commands, active command limiter 530a adds the latency cost of the completed SSD command to the available latency budget. By maintaining a presently available latency budget for isolation region 540 that accounts for the latency cost of each issued SSD command and not issuing a further SSD command if there is insufficient latency budget available, active command limiter 530a ensures that the latency caused by active SSD commands is limited to the total latency budget.

Active command limiter 530b enforces a limit on SSD commands that are active in isolation region 550. In one embodiment, the limit is the number of SSD read commands that are active in isolation region 550. By limiting the number of SSD commands that are concurrently active in isolation region 550, the probability of a collision between an SSD command and a host command is reduced and latency variations in the performance of isolation region 550 are minimized. In one embodiment, active command limiter 530b maintains a count of the number of SSD commands that are active, i.e., the SSD read commands that have been issued to channel queues 552 and 554 for execution but have not yet completed. Active command limiter 530b compares the present count of the number of active SSD read commands in isolation region 550 with a maximum number of allowed active commands and only issues a queued SSD command 574 for execution if the present count is less than the maximum allowed. In one embodiment, the maximum number of allowed active commands is a predetermined value that remains constant. In other embodiments, the maximum number of allowed active commands is a parameter whose value can be changed by firmware 122 or a host. In one embodiment, the maximum number of allowed active commands has a first value when isolation region 550 is in deterministic mode and has a second value when isolation region 550 is in non-deterministic mode. In one embodiment, the maximum number of allowed active commands in non-deterministic mode is set to a value that depends on the number of commands pending is SSD command queues 524. In this embodiment, any backlog of SSD commands put into SSD command queues 524 while isolation region 550 is in deterministic mode may be processed more quickly in non-deterministic mode to ensure that the overall rate of processing SSD commands in deterministic and non-deterministic mode meets a minimum required level.

When active command limiter 530b issues a queued SSD command 574 to one of channel queues 552, 554 active command limiter 530b also increments the count of the number of active commands. When active command limiter 530b receives a completion 576 of an active SSD command, active command limiter 530b decrements the count of the number of active commands. By incrementing a count of active SSD commands when an SSD command is issued to isolation region 550 and decrementing the count of active SSD commands when an SSD command completion is returned, active command limiter 530b maintains a present count of active SSD commands for isolation region 550. Active command limiter 530b also ensures that the present number of active SSD commands does not exceed the maximum number of allowed active SSD commands for isolation region 550.

In another embodiment, active command limiter 530b limits the number of concurrently active SSD commands in isolation region 550 by enforcing a latency budget for active SSD commands. In this embodiment, active command limiter 530b establishes a total latency budget for active SSD commands in isolation region 550, assigns a latency cost to each SSD command, and maintains a presently available latency budget as each SSD command is issued and completed. Active command limiter 530b compares the latency cost of an SSD command to the available latency budget, and only issues the SSD command to isolation region 550 if the cost is less than or equal to the available latency budget. In one embodiment, active command limiter 530b assigns the cost to an SSD command based on the latency that the SSD command will cause to a succeeding SSD command waiting to be issued to the same NAND die or waiting to be issued to a different NAND die on the same channel in isolation region 550. In one embodiment, the latency that the SSD command will cause to a succeeding SSD command depends on the command type. For example, an erase command will cause a longer latency to a succeeding command than a read command. When active command limiter 530b issues a queued SSD command 574 to one of channel queues 552,554 active command limiter 530b also subtracts the latency cost of the issued SSD command from the available latency budget. When active command limiter 530b receives a completion 576 of an active SSD commands, active command limiter 530b adds the latency cost of the completed SSD command to the available latency budget. By maintaining a presently available latency budget for isolation region 550 that accounts for the latency cost of each issued SSD command and not issuing a further SSD command if there is insufficient latency budget available, active command limiter 530b ensures that the latency caused by active SSD commands is limited to the total latency budget.

FIG. 5 shows active command limiter 530a and active command limiter 530b as two separate entities. In one embodiment, each of active command limiter 530a and active command limiter 530b is a program implemented as part of firmware 122 of memory controller 120. In another embodiment, each of active command limiter 530a and active command limiter 530b is a dedicated hardware-accelerated component of memory controller 120. In another embodiment, active command limiter 530a and active command limiter 530b are implemented as separate processes of a program implemented as part of firmware 122. In another embodiment, each of active command limiter 530a and active command limiter 530b is a sub-component of a dedicated hardware-accelerated component of memory controller 120.

Figure 6A:
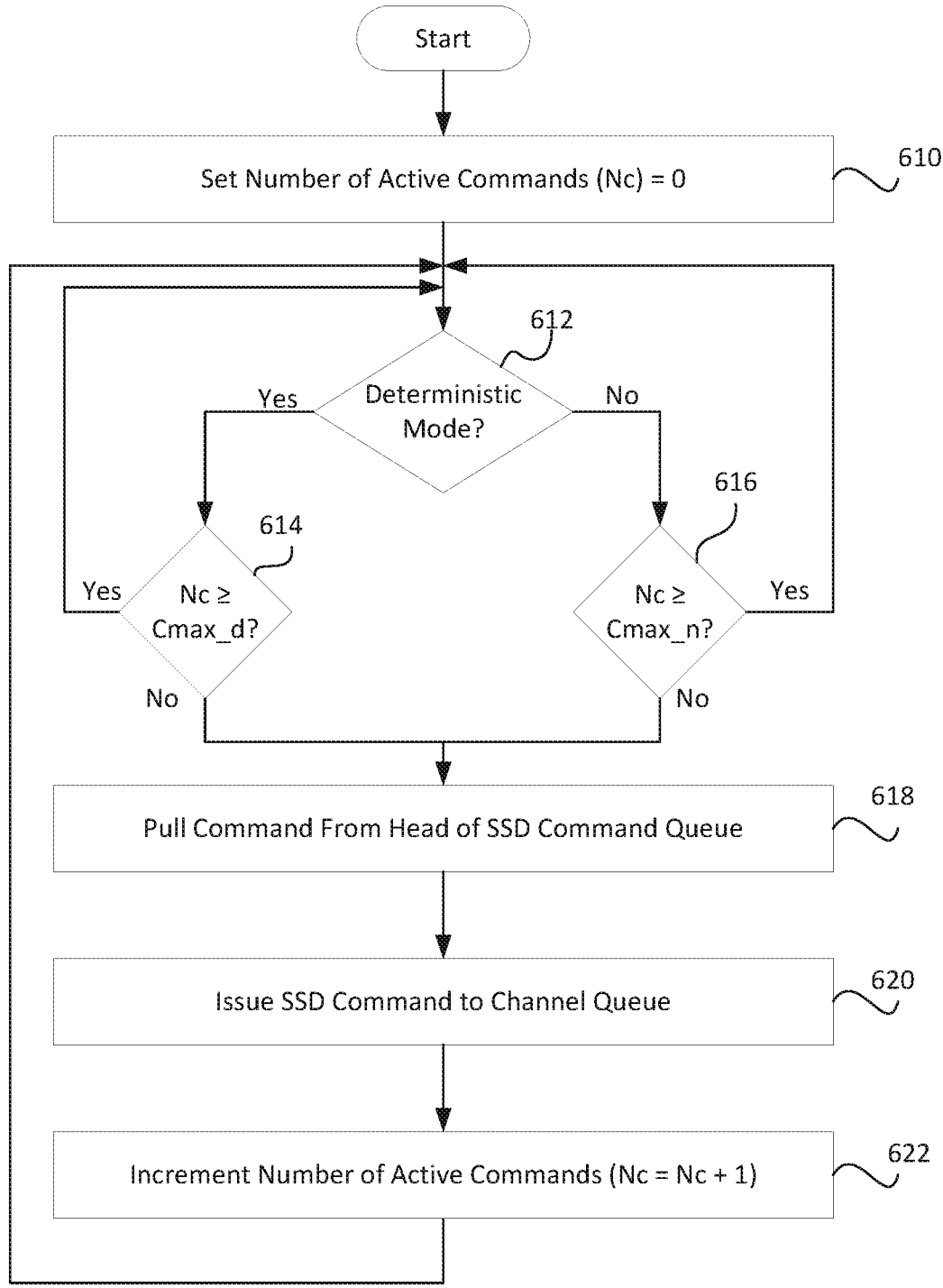
FIG. 6A is a flowchart of method steps for managing internal command queues in a solid state storage drive that has a deterministic mode and a non-deterministic mode, according to one embodiment.

FIG. 6A is a flowchart of method steps for managing internal command queues in a solid state storage drive that has a deterministic mode and a non-deterministic mode, according to one embodiment. In a step 610, active command limiter 220 sets the number of active commands to zero. In a step 612, active command limiter 220 determines whether SSD 100 or an isolation region within SSD 100 is in a deterministic mode, during which only limited operations are intended to be performed, or is in a non-deterministic mode, when all types of I/O operations and maintenance operations are intended to be performed. In order to achieve read-only operating conditions, a host may operate a self-policed policy of not issuing any non-read (i.e., write) I/O commands while in deterministic mode. In some embodiments, memory controller 120 may also operate a policy of not issuing non-read commands for internal operations during deterministic mode and enforce a read-only policy for host I/O commands during deterministic mode such that if a write host I/O command is received, memory controller 120 autonomously switches to non-deterministic mode. If SSD 100 or the isolation region is in deterministic mode, then in a step 614 active command limiter 220 compares the number of active SSD commands to a maximum number of allowed active SSD commands while in deterministic mode (Cmax_d). In one embodiment, the maximum number of allowed active SSD commands is one. If the number of active SSD commands is greater than or equal to Cmax_d, then the method returns to step 612. If the number of active SSD commands is not greater than or equal to Cmax_d, then the method continues to step 618. If SSD 100 or the isolation region is in non-deterministic mode, then in a step 616 active command limiter 220 compares the number of active SSD commands to a maximum number of allowed active SSD commands while in non-deterministic mode (Cmax_n). In one embodiment, the maximum number of allowed active SSD commands while in non-deterministic mode is about 10; in other embodiments the maximum of allowed active SSD commands while in non-deterministic mode is within the range of about 5 to about 10. In one embodiment, the maximum number of allowed active SSD commands while in non-deterministic mode is a value determined by firmware 122 and initially based on the number of commands in the SSD command queue at the time of entering non-deterministic mode. In one embodiment, one or both of Cmax_d and Cmax_n is predetermined fixed value. In another embodiment, one or both of Cmax_d and Cmax_n is a value that is set by an administrator of SSD 100 or by a host. If the number of active SSD commands is greater than or equal to Cmax_n, then the method returns to step 612. If the number of active SSD commands is not greater than or equal to Cmax_n, then the method continues in step 618.

In step 618, active command limiter 220 pulls an SSD command from the head of the SSD command queue. In a step 620, active command limiter 220 issues the SSD command to the channel queue for the NAND die identified in the SSD command. In a step 622, active command limiter 220 increments the number of active commands by one. The method then returns to step 612. Active command limiter 220 decrements the number of active commands by one when it receives a completion from a channel queue, as shown in FIG. 3B.

Figure 6B:
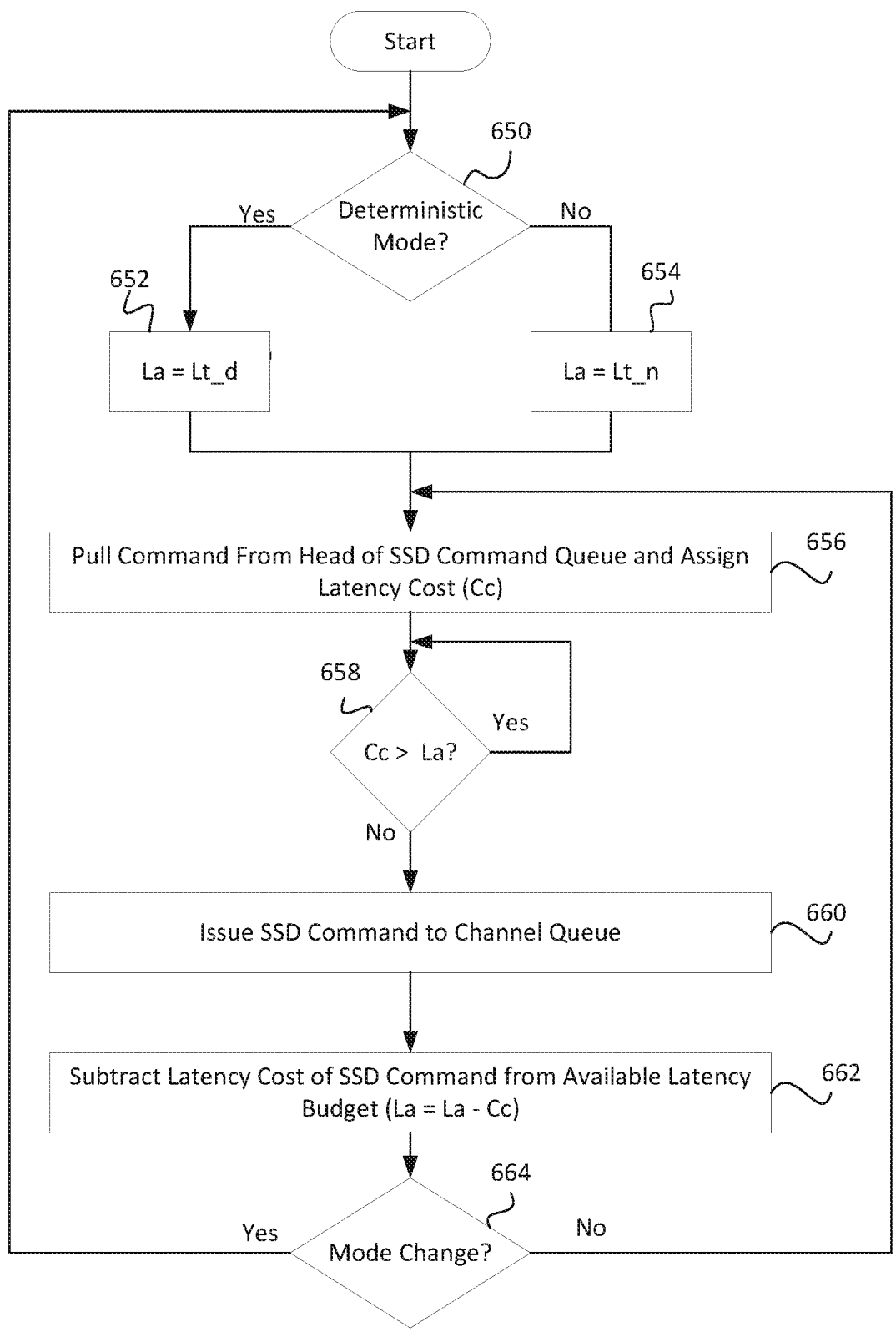
FIG. 6B is a flowchart of method steps for managing internal command queues in a solid state storage drive that has a deterministic mode and a non-deterministic mode, according to one embodiment.

FIG. 6B is a flowchart of method steps for managing internal command queues in a solid state storage drive that has a deterministic mode and a non-deterministic mode, according to one embodiment. In a step 650, active command limiter 220 determines whether SSD 100 or an isolation region within SSD 100 is in a deterministic mode, during which only limited operations are intended to be operating, or is in a non-deterministic mode, when all types of I/O operations and maintenance operations are intended to be performed. If SSD 100 or the isolation region is in deterministic mode, then in a step 652 active command limiter 220 sets the available latency budget for active SSD commands (La) equal to a predetermined total latency budget in deterministic mode (Lt_d). If SSD 100 or the isolation region is in non-deterministic mode, then in a step 654 active command limiter 220 sets the available latency budget for active SSD commands (La) equal to a predetermined total latency budget in non-deterministic mode (Lt_n). In one embodiment, the total latency budget in non-deterministic mode (Lt_n) is a value determined by firmware 122 and initially based on the number of commands in the SSD command queue(s) at the time of entering non-deterministic mode. In one embodiment, one or both of Lt_d and Lt_n is predetermined fixed value. In another embodiment, one or both of Lt_d and Lt_n is a value that is set by an administrator of SSD 100 or by a host. In a step 656, active command limiter 220 pulls an SSD command from the head of the SSD command queue and assigns a latency cost (Cc) to that SSD command. In a step 658, active command limiter 220 compares the latency cost of the SSD command (Cc) to the available latency budget (La). If the latency cost of the SSD command is greater than the available latency budget, then the method repeats step 658. If the latency cost of the SSD command is less than or equal to the available latency budget, the method continues to a step 660.

In a step 660, active command limiter 220 issues the SSD command to the channel queue for the NAND die identified in the SSD command. In a step 662, active command limiter 220 subtracts the latency cost of the SSD command (Cc) from the available latency budget for active SSD commands. Active command limiter 220 adds the latency cost of the SSD command (Cc) to the available latency budget (La) when it receives a completion from a channel queue, as shown in FIG. 4B. In a step 664, active command limiter 220 determines whether SSD 100 or an isolation region within SSD 100 has changed from deterministic mode to non-deterministic mode (or vice-versa). If the mode has changed, the method then returns to step 650. If the mode has not changed, the method returns to step 656.

Other objects, advantages and embodiments of the various aspects of the present invention will be apparent to those who are skilled in the field of the invention and are within the scope of the description and the accompanying Figures. For example, but without limitation, structural or functional elements might be rearranged, or method steps reordered, consistent with the present invention. Similarly, a machine may comprise a single instance or a plurality of machines, such plurality possibly encompassing multiple types of machines which together provide the indicated function. The machine types described in various embodiments are not meant to limit the possible types of machines that may be used in embodiments of aspects of the present invention, and other machines that may accomplish similar tasks may be implemented as well. Similarly, principles according to the present invention, and methods and systems that embody them, could be applied to other examples, which, even if not specifically described here in detail, would nevertheless be within the scope of the present invention.

What is claimed is:

1. A method for reducing the variance in latency of host I/O commands by managing non-host command queues in a solid state storage drive, comprising:
    receiving a plurality of non-host commands in at least one non-host command queue, each of the plurality of non-host commands configured to be executed by one of a plurality of non-volatile memory dies;
    determining whether a latency-reducing condition is satisfied based on one or more active non-host commands, wherein each of the one or more active non-host commands is a non-host command that has been issued from the at least one non-host command queue to one of the plurality of non-volatile memory dies for execution and has not completed; and
    issuing a non-host command from the at least one non-host command queue to one of the plurality of non-volatile memory dies when the latency-reducing condition is satisfied.

2. The method of claim 1, further comprising:
    setting a first maximum number of active non-host commands;
    comparing a present number of active non-host commands to the first maximum number of active non-host commands; and
    determining that the latency-reducing condition is satisfied if the present number of active non-host commands is less than the first maximum number of active non-host commands.

3. The method of claim 2, further comprising:
    incrementing a value representing the present number of active non-host commands upon issuance of the non-host command for execution; and
    decrementing the value representing the present number of active non-host commands upon completion of an issued non-host command.

4. The method of claim 2, further comprising:
    setting the first maximum number of active non-host commands to a first predetermined value when the plurality of non-volatile memory dies is in a first operation mode; and
    setting the first maximum number of active non-host commands to a second predetermined value when the plurality of non-volatile memory dies is in a second operation mode, the second operation mode being different from the first operation mode.

5. The method of claim 2, further comprising:
    setting the first maximum number of active non-host commands for a first region of the plurality of non-volatile memory dies, the first region comprising a first subset of physical blocks of the plurality of non-volatile memory dies; and
    setting a second maximum number of active non-host commands for a second region of the plurality of non-volatile memory dies, the second region comprising a second subset of physical blocks of the plurality of non-volatile memory dies, the second region being different than the first region.

6. The method of claim 2, wherein setting the first maximum number of active non-host commands comprises receiving a value from a host, and setting the first maximum number equal to the value received from the host.

7. The method of claim 1, further comprising:
    assigning a latency cost to a non-host command from the at least one non-host command queue;
    comparing the latency cost of the non-host command to an available latency budget for the one or more active non-host commands; and
    determining that the latency-reducing condition is satisfied if the latency cost of the non-host command is less than or equal to the available latency budget for active non-host commands.

8. The method of claim 7, further comprising:
    subtracting the latency cost of the non-host command from the available latency budget upon issuance of the non-host command to one of the plurality of non-volatile memory dies; and
    adding the latency cost of the non-host command to the available latency budget upon completion of the non-host command.

9. The method of claim 7, further comprising setting the available latency budget equal to a total latency budget for active non-host commands prior to issuing non-host commands to the plurality of non-volatile memory dies.

10. The method of claim 7, wherein assigning a latency cost to the non-host command comprises determining a latency effect the non-host command will cause to a succeeding command addressed to the same one of the plurality of non-volatile memory dies as the non-host command.

11. The method of claim 7, wherein assigning a latency cost to the non-host command comprises determining a latency effect the non-host command will cause to a succeeding command addressed to another one of the plurality of non-volatile memory dies communicatively coupled to a channel to which the one of the plurality of non-volatile memory dies addressed in the non-host command is communicatively coupled.

12. The method of claim 7, further comprising:
    determining a present operation mode of the plurality of non-volatile memory dies, the present operation mode being one of a first operation mode or a second operation mode;
    setting the available latency budget equal to a first total latency budget when the plurality of non-volatile memory dies is in the first operation mode; and
    setting the available latency budget equal to a second total latency budget when the plurality of non-volatile memory devices is in the second operation mode.

13. The method of claim 7, further comprising:
    maintaining a first available latency budget for a first region of the plurality of non-volatile memory dies, the first region comprising a first subset of physical blocks of the plurality of non-volatile memory dies; and
    maintaining a second available latency budget for a second region of the plurality of non-volatile memory dies, the second region comprising a second subset of physical blocks of the plurality of non-volatile memory dies, the second region being different than the first region.

14. A system for reducing the variance in latency of host I/O commands by managing non-host command queues in a solid state storage drive, comprising:
    a plurality of non-volatile memory dies;
    at least one non-host command queue configured to store a plurality of non-host commands, each of the plurality of non-host commands configured to be executed by one of the plurality of non-volatile memory dies; and
a memory controller communicatively coupled to each of the plurality of non-volatile memory dies, the memory controller configured to:
   determine whether a latency-reducing conditions is satisfied based on one or more active non-host commands, wherein each of the one or more active non-host commands is a non-host command that has been issued from the at least one non-host command queue to one of the plurality of non-volatile memory dies for execution and has not completed; and
   issue a non-host command from the at least one non-host command queue to one of the plurality of non-volatile memory dies when the latency-reducing condition is satisfied.

15. The system of claim 14, wherein the memory controller is configured to:
   set a first maximum number of active non-host commands;
   compare a present number of active non-host commands to the first maximum number of active non-host commands; and
   determine that the latency-reducing condition is satisfied if the present number of active non-host commands is less than the first maximum number of active non-host commands.

16. The system of claim 15, wherein the memory controller is further configured to:
   increment a value representing the present number of active non-host commands upon issuance of the non-host command for execution; and
   decrement the value representing the present number of active non-host commands upon completion of an issued non-host command.

17. The system of claim 15, wherein the memory controller is configured to set the first maximum number of active non-host commands to a first predetermined value when the plurality of non-volatile memory dies is in a first operation mode, and to set the first maximum number of active non-host commands to a second predetermined value when the plurality of non-volatile memory dies is in a second operation mode, the second operation mode being different than the first operation mode.

18. The system of claim 15, wherein each of the plurality of non-volatile memory dies comprises a plurality of physical blocks, a first region comprises a first subset of physical blocks of the plurality of non-volatile memory dies, and a second region comprises a second subset of physical blocks of the plurality of non-volatile memory dies, the second region being different from the first region, and the memory controller is further configured to set the first maximum number of active non-host commands for the first region and to set a second maximum number of active non-host commands for the second region.

19. The system of claim 15, wherein the memory controller is configured to set the first maximum number of active non-host read commands to a value received from a host communicatively coupled to the solid state storage drive.

20. The system of claim 14, further comprising at least one non-host read command queue, at least one non-host write command queue, and at least one erase command queue.

21. The system of claim 14, wherein the memory controller is configured to:
   assign a latency cost to a non-host command from the at least one non-host command queue;
   compare the latency cost of the one or more non-host command to an available latency budget for active non-host commands; and
   determine that the latency-reducing condition is satisfied if the latency cost of the non-host command is less than or equal to the available latency budget.

22. The system of claim 21, wherein the memory controller is further configured to
   subtract the latency cost of the non-host command from the available latency budget upon issuance of the non-host command to one of the plurality of non-volatile memory dies; and
   add the latency cost of the non-host command to the available latency budget upon completion of the non-host command.

23. The system of claim 21, wherein the memory controller is further configured to set the available latency budget equal to a total latency budget for active non-host commands prior to issuing non-host commands to the plurality of non-volatile memory dies.

24. The system of claim 21, wherein the memory controller is configured to assign the latency cost to the non-host command by determining a latency effect the non-host command will cause to a succeeding command addressed to the same one of the plurality of non-volatile memory dies as the non-host command.

25. The system of claim 21, wherein the memory controller is further configured to assign a latency cost to the non-host command by determining a latency effect the non-host command will cause to a succeeding command addressed to another one of the plurality of non-volatile memory dies communicatively coupled to a channel to which the one of the plurality of non-volatile memory dies addressed in the non-host command is communicatively coupled.

26. The system of claim 21, wherein the memory controller is further configured to
   determine a present operation mode of the plurality of non-volatile memory dies, the present operation mode being one of a first operation mode or a second operation mode;
   set the available latency budget equal to a first total latency budget when the plurality of non-volatile memory dies is in the first operation mode; and
   set the available latency budget equal to a second total latency budget when the plurality of non-volatile memory devices is in the second operation mode.

27. The system of claim 21, wherein each of the plurality of non-volatile memory dies comprises a plurality of physical blocks, a first region comprises a first subset of physical blocks of the plurality of non-volatile memory dies, and a second region comprises a second subset of physical blocks of the plurality of non-volatile memory dies, the second region being different from the first region, and the memory controller is further configured to maintain a first available latency budget for the first region and a second available latency budget for the second region.

* * * * *